United States Patent [19]

Day

[11] 4,260,868
[45] Apr. 7, 1981

[54] CURRENT CARRYING RECIPROCABLE FLUID MOTOR

[75] Inventor: Harry E. Day, Bloomfield Hills, Mich.

[73] Assignee: Day Industrial Research Corporation, Ferndale, Mich.

[21] Appl. No.: 964,468

[22] Filed: Nov. 29, 1978

[51] Int. Cl.³ .................... B23K 11/10; H01R 41/00
[52] U.S. Cl. ................................ 219/86.31; 219/89; 339/9 R
[58] Field of Search .............. 219/89, 119, 120, 86.25, 219/86.31; 339/9 R, 9 A, 9 E

[56] References Cited

U.S. PATENT DOCUMENTS

| | | | |
|---|---|---|---|
| 2,004,620 | 6/1935 | Tarbox | 219/89 |
| 2,293,338 | 8/1942 | Harris | 219/89 |
| 2,318,024 | 5/1943 | Strickland, Jr. | 219/89 X |
| 2,810,893 | 10/1957 | Nijland | 339/9 R |
| 2,863,983 | 12/1958 | Kane et al. | 219/89 X |
| 2,923,908 | 2/1960 | Cejka | 339/9 A |
| 2,980,788 | 3/1961 | Hunter et al. | 219/89 X |
| 3,287,538 | 11/1966 | Dicks | 219/89 |
| 3,538,294 | 11/1970 | Dicks et al. | 219/89 |

FOREIGN PATENT DOCUMENTS

| | | | |
|---|---|---|---|
| 551720 | 3/1943 | United Kingdom | 219/119 |
| 274263 | 9/1970 | U.S.S.R. | 219/120 |
| 545433 | 4/1977 | U.S.S.R. | 219/89 |

Primary Examiner—Elliot A. Goldberg
Assistant Examiner—Keith E. George
Attorney, Agent, or Firm—Harness, Dickey & Pierce

[57] ABSTRACT

Means are shown for carrying current within the moving members of a reciprocable fluid motor such as is used to operate a welding gun. The current is transmitted from a cable to the piston rod through a stationary contactor having a portion secured to the cylinder housing and circumferentially arranged leaves held by a spring against the piston rod surface. The seal construction is such as to permit the use of lubricants on the sliding contact surface and at the same time prevent cooling water for entering the lubricating reservoir. The external contactor permits use of a hollow type piston rod allowing cooling water to be carried therethrough if desired. When used for welding gun applications the invention eliminates the need for flexible type shunts and separate electrode holders along with flexible water hoses in the welding area. The invention may also be utilized for lower power applications such as sensing devices.

14 Claims, 12 Drawing Figures

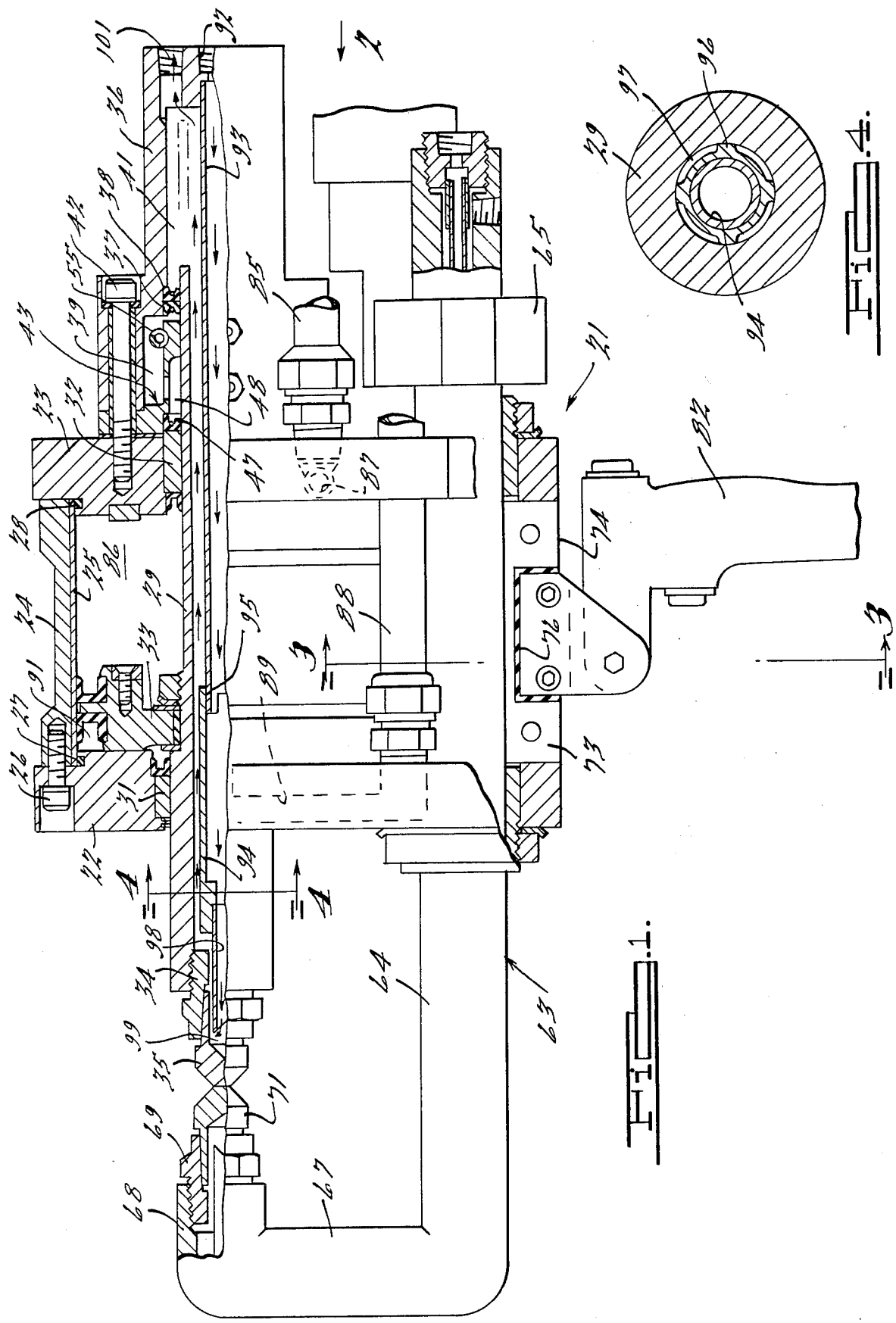

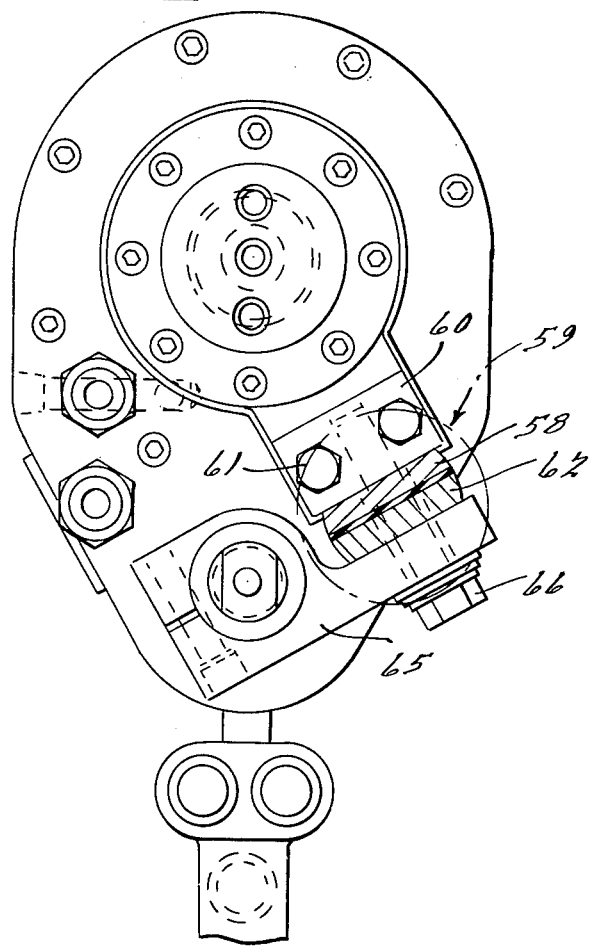
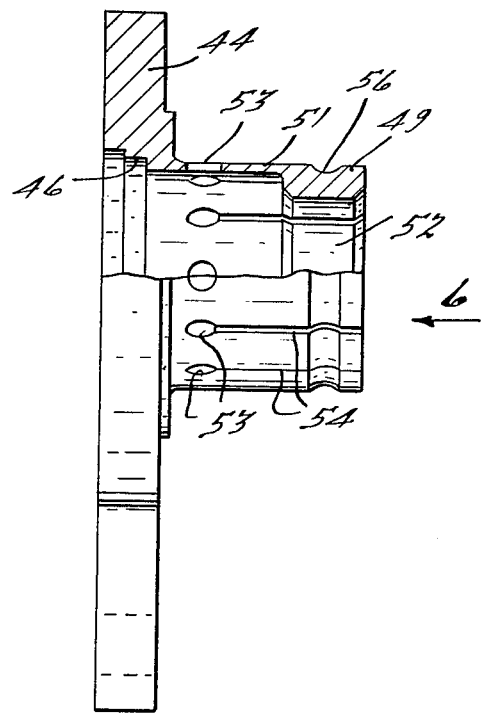
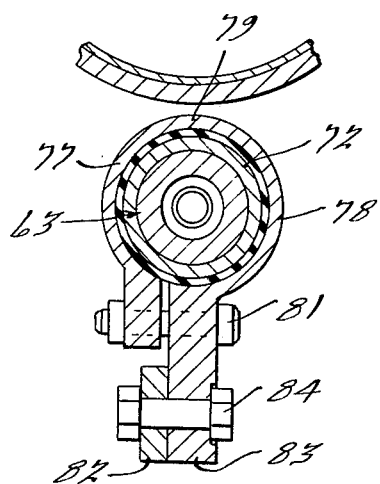
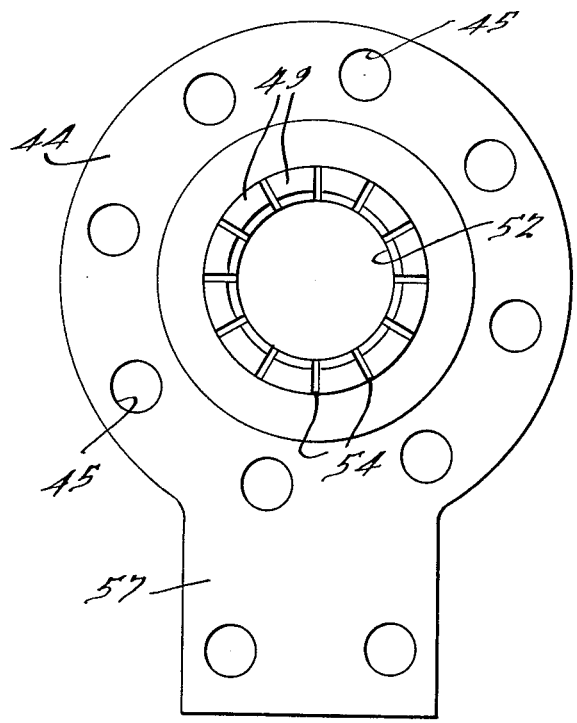

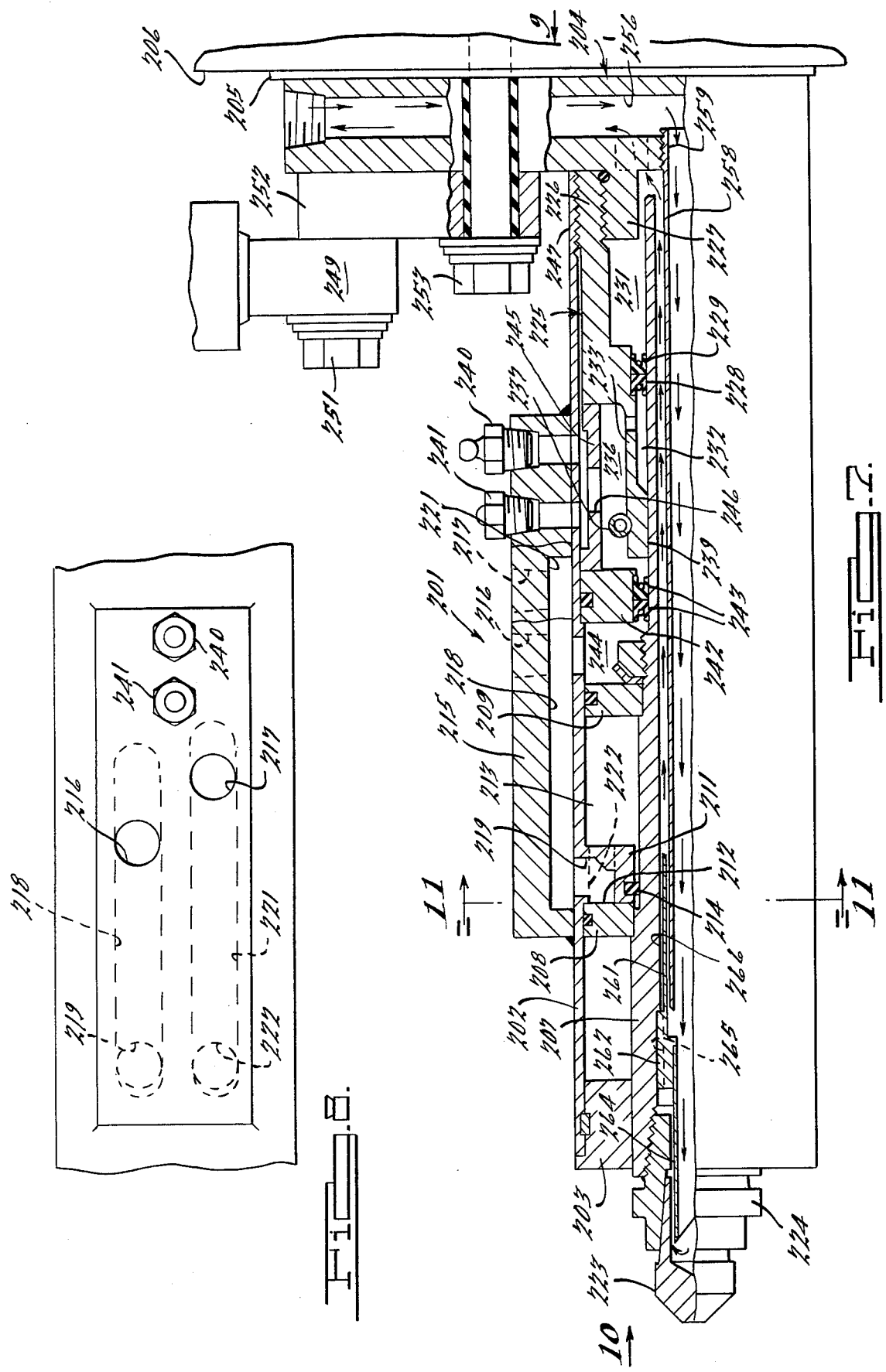

CURRENT CARRYING RECIPROCABLE FLUID MOTOR

BACKGROUND OF THE INVENTION

1. Field of the Invention

The invention relates to reciprocable fluid motors and more particularly to such motors which, for one reason or another, require the use of electrical power in conjunction with their operation. Examples of such uses are for welding guns and for sensing devices where it is desired to have some definite signal when positive contact is made by a reciprocable motor.

2. Description of the Prior Art

It is known to carry current in the needles of seam welder rollers. In such cases ionization sets up a plating effect which has a deleterious affect on bearing size.

A search of the prior art revealed the following pertinent U.S. patents:

Strickland U.S. Pat. No. 2,318,024: This patent shows adjustable contact blocks forming a split sleeve carrying current to a piston rod for a welding apparatus.

Dicks et al U.S. Pat. No. 3,538,294 discloses split fingers forming part of a piston rod which are spread into electrical contact with a cylinder surface in a welding device.

Tarbox U.S. Pat. No. 2,004,620 shows a welding tool in which the current passes through the cylinder directly to the piston.

Harris U.S. Pat. No. 2,293,338 shows another welding apparatus in which the cylinder and a split piston form part of the circuit.

Kane et al U.S. Pat. No. 2,863,983 shows an arc welding torch in which a split collet is carried by the piston and stationarily grips the electrode during operation.

These patents fail to achieve the objects of compactness, efficiency, facility for cooling, reduction of power consumption and others set forth below.

BRIEF SUMMARY OF THE INVENTION

It is an object of the invention to overcome the disadvantages of previous constructions and provide a novel and improved current carrying reciprocable fluid motor which is compact, simple and efficient in operation.

It is another object to provide an improved current carrying reciprocable fluid motor of this character which prevents cooling water, when used, from entering the lubricating reservoir used for the stationary contactor. It is also an object, as applied to welding gun applications, to provide a novel and improved fluid motor of this type which permits the use of a hollow type piston rod having electrode cooling water, thus obtaining the dual effect of a water cooled electrode as well as a water cooled sliding contact surface without the use of any flexible water hoses.

It is a further object to provide an improved construction of this nature which eliminates flexible type shunts and separate electrode holders along with flexible water hoses in the welding area, thus permitting greater utilization of the normal gun loop and reducing air gap impedance.

It is a further object to provide a novel and improved fluid motor of this character which will reduce electric power consumption, downtime and maintenance and improve safety.

It is another object, as applied to welding guns, to provide an improved motor construction of this nature which will allow automatic interchangeability with other similar units as used by six axis manipulators, thus extending the use of so-called "robots" by extending their possible programmed use.

Briefly, the invention comprises a cylinder, a piston rod slidable in said cylinder, a stationary contactor having a first portion secured to said cylinder and a plurality of circumferentially arranged flexible fingers extending axially from said first portion, said fingers having inwardly facing surfaces, means urging said surfaces into contact with external surface of said piston rod, and means connecting an electrical cable to said first portion of the stationary contactor.

BRIEF DESCRIPTION OF THE DRAWINGS

FIG. 1 is an elevational view, partly sectioned, showing a current carrying reciprocable fluid motor as applied to a portable type welding gun.

FIG. 2 is an end elevational view, taken in the direction of the arrow 2 of FIG. 1.

FIG. 3 is a fragmentary cross-sectional view taken along the line 3—3 of FIG. 1.

FIG. 4 is a cross-sectional view taken along the line 4—4 of FIG. 1.

FIG. 5 is a partially sectioned elevational view of the stationary contactor.

FIG. 6 is an end elevational view taken in the direction of the arrow 6 of FIG. 5.

FIG. 7 is a partly sectioned side elevational view of another embodiment of the invention as applied to a fixture type welding gun.

FIG. 8 is a fragmentary top plan view of the embodiment of FIG. 7.

DESCRIPTION OF THE PREFERRED EMBODIMENTS

Figure 9:
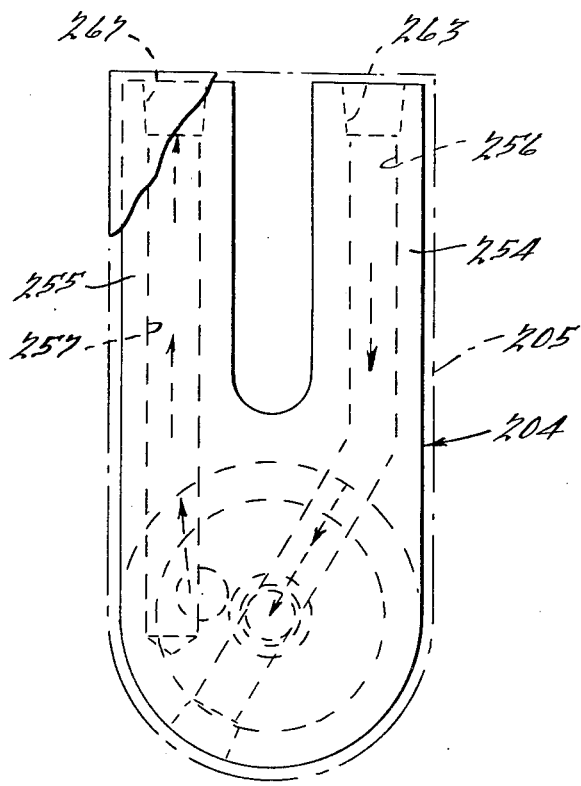
FIG. 9 is an end elevational view thereof taken in the direction of the arrow 9 of FIG. 7.
Figure 10:
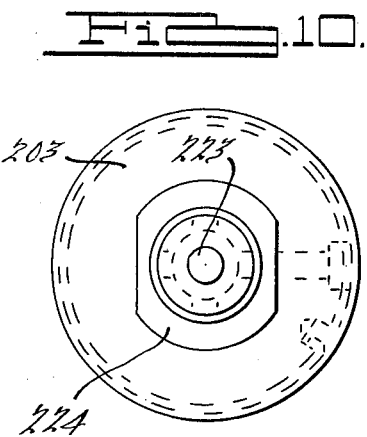
FIG. 10 is an end elevational view taken in the direction of the arrow 10 of FIG. 7.
Figure 11:
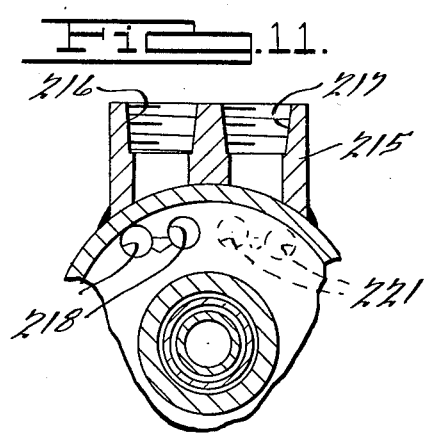
FIG. 11 is a fragmentary cross-sectional view taken along the line 11—11 of FIG. 7.

FIGS. 1 to 6 show a portable type welding gun generally indicated at 21 which incorporates the invention. The gun comprises a head 22 and a tail 23, these parts being secured to opposite ends of a cylindrical housing 24. A sleeve 25 is mounted within housing 24, the housing being secured to the head and tail by bolts 26. Seals 27 and 28 are disposed between the sleeve and the head and tail respectively.

A piston rod 29 is slidably mounted in bushings 31 and 32 carried by head 22 and tail 23 respectively. A piston 33 is secured to piston rod 29 and is slidably mounted within sleeve 25 for reciprocation of the piston rod. A thread adaptor 34 is secured to the forward end of piston rod 29 and carries an electrode tip 35. The forward end of piston rod 29 is of relatively large diameter and the rearward end of narrower diameter. A cylindrical housing 36 surrounds the rearward portion of piston rod 29. A double seal having elements 37 and 38 is mounted within an intermediate portion of housing 36 and slidably engages piston rod 29. This double seal forms a grease chamber 39 on one side and a cooling water chamber 41 on the rearward side. The seals are so shaped that pressure in either chamber will tend to expand its seal against the piston rod.

Bolts 42 secure the wider forward portion of housing 36 to tail 23. A contactor generally indicated at 43 is disposed between housing 36 and tail 23. The construction of this contactor is best seen in FIGS. 5 and 6. The contactor has an annular portion 44 with bolt holes 45 to receive bolts 42. A recess 46 is formed in this annular portion for a seal 47 which is disposed adjacent bushing 32 and engages piston rod 29 to seal a grease chamber 48 connected to grease chamber 39. A plurality of axial extensions 49 project from mounting portion 44 and form contacting fingers which slidably engage piston rod 29. More particularly, fingers 49 have relatively thin flexible portions 51 and thicker outer portions having inner surfaces 52. Apertures 53 at the inner ends of slots 54 between the fingers connect grease chambers 39 and 48 and aid in flexibility of the fingers. A garter spring 55 surrounds the fingers and fits in a groove 56 to hold surfaces 52 against piston rod 29 for conduction. The grease filling chambers 39 and 48 may be a silver grease of known type which aids in conduction.

A cable connecting extension 57 is provided on portion 44 of contactor 43. This extension is for the purpose of connecting with one conductor 58 of a kickless cable generally indicated at 59, this cable being connected to the secondary side of a transformer (not shown). For this purpose, a connector adaptor 60 is provided to secure conductor 58 to extension 57 by means of bolts 61.

The other conductor 62 of cable 59 is connected to a lower gun adaptor arm generally indicated at 63. The lower portion 64 of this arm extends through head 22 and tail 23, the rearward portion having a split connector clamp 65 secured thereto. Conductor 62 is attached to connector clamp 65 by a bolt 66. The forward end of arm 63 extends upwardly as shown at 67 and the upper end 68 extends rearwardly, carrying a thread adaptor 69 to which is secured a stationary electrode tip 71 aligned with electrode tip 35.

An adaptor 72 surrounds the portion of lower arm 63 between head 22 and tail 23, this adaptor having extensions 73 and 74 with bolts passing therethrough to clamp the adaptor onto the lower arm. The recessed midportion 76 of adaptor 72 carries a two-piece trigger adaptor 77, 78 (FIG. 3). The upper portions of this two-piece trigger adaptor are interlocked at 79 by a tee-and-slot connection. The lower portions are secured together by a bolt 81 which clamps the trigger adaptor to adaptor 72. A trigger 82 is secured to the lower portion 83 of trigger adaptor part 78 by a bolt 84 and extends therebelow.

The fluid pressure for advancing piston 33 to the left in FIG. 1 is provided by a conduit 85 connected to chamber 86 of cylinder 24 by a passage 87 in tail 23. Fluid pressure for retracting piston 33 to the right is supplied by a conduit 88 connected to head 22 which has a passage shown partially at 89 leading to chamber 91.

Means are provided for conducting cooling water to piston rod 29 and electrodes 35 and 71. Since the stationary contactor 43 is external to the piston rod and the sliding contact surface is the external piston rod surface, a hollow type piston rod may be utilized which permits water used for cooling the electrode to be carried through the piston rod. The water thus had the dual effect of cooling the electrode as well as the sliding contact surface without the need for flexible water hoses. A water inlet port 92 at the rearward end of housing 36 conducts water to the interior of a tubular water conductor 93 fixed at its rearward end to the interior of housing 36. A second tubular adaptor 94 is mounted within the forward end of piston rod 29 (FIG. 4) and its rearward end overlaps the forward end of the tube 93 as indicated at 95. The forward end of tube 94 is supported within hollow piston rod 29 by circumferentially spaced portions 96, leaving spaces 97 therebetween. A water deflector tube 98 leads forwardly from the forward end of tube 94 to electrode tip 35, with a passage 99 within the electrode tip conducting water from the interior of tube 98 to the exterior thereof. The water flow will thus be along the path of the arrows in FIG. 1, returning rearwardly in the space between tubes 41 and 93 and piston rod 29, and entering the chamber 94. An outlet port 101 is connected to the rearward end of this chamber. It will be observed that double seals 37, 38, which are back-to-back, permit the use of lubricants carried by chamber 39 on the sliding contact surface while at the same time preventing the cooling water from entering the lubricating reservoir. In general practice, contacting surfaces of this type, when used for carrying heavy currents, are lubricated with a non-mineral type of lubricant having powdered silver in suspension.

In operation, the path of current may be traced from conductor 62 of cable 59 through clamp 65, lower gun adaptor arm 63 and electrode tip 71 to the work (not shown). The current path may then be traced through electrode tip 35 and adaptor 34 to piston rod 29. Garter spring 55 will hold fingers 51 of stationary contactor 43 in electrical contacting engagement with the external piston rod surface. The current flow will thus be through contactor 43 to cable conductor 58.

FIGS. 7 through 12 show a second embodiment of the invention which is a current carrying fixture type weld gun cylinder generally indicated at 201. This device has a cylinder 202 with a head bushing 203 at the forward end thereof and a base generally indicated at 204 at the rearward end. An insulator 205 is disposed between base 204 and the fixture mounting surface 206. A piston rod 207 is slidably mounted in head bushing 203 and carries pistons 208 and 209. An inward extension 211 on the interior of cylinder 202 divides the cylinder into two chambers, an advancing chamber 212 exposed to piston 208 and a retracting chamber 213 exposed to piston 209, a seal 214 engaging piston rod 207 to separate the two chambers. A port housing 215 surmounts cylinder 202 and carries a "gun forward" port 216 and a "gun retract" port 217. Passages 218 lead from port 216 through housing 215 (FIG. 11) to a port 219 in cylinder 202 leading to a chamber 212. Passages 221 lead from port 217 to a passage 222 in cylinder 202 which leads to chamber 213. An electrode tip 223 carried by piston 207 by means of an adaptor 224 may thus be advanced or retracted by the selective application of fluid pressure to ports 216 or 217.

Figure 12:
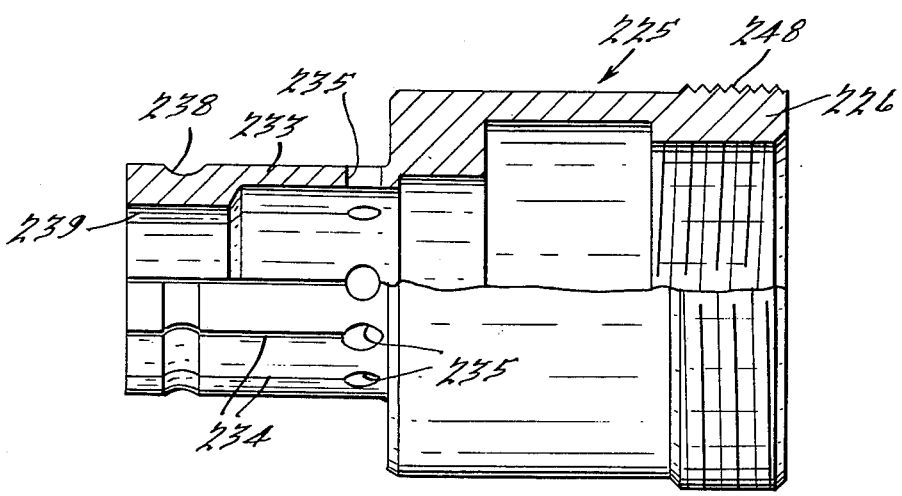
FIG. 12 is a partially sectioned elevational view of the stationary contactor of the embodiment of FIG. 7.

A stationary contactor generally indicated at 225 is provided for conducting electrical current to piston rod 207. Contactor 225 has a mounting portion 226 threadably mounted on a forward extension 227 of base 204, this extension being concentric with the cylinder. Contactor 225 extends forwardly from its portion 226 and an intermediate portion carries a back-to-back double seal 228, 229 engaging piston rod 207. These double seals separate a cooling water chamber 231 within contactor 225 from a grease chamber 232 forwardly thereof. As seen in FIG. 12, the forward portion of contactor 225 comprises a plurality of spring-like fingers 233 separated by slits 234. Apertures 235 are provided at the rearward end of slits 234 for aiding the spring-like action of the fingers and also to connect chamber 232 with a grease chamber 236 outwardly of the fingers. A garter spring 237 is disposed in a recess 238 around the forward ends of the fingers and presses the fingers inwardly so that their inner surfaces 239 engage piston rod 207. As in the previous embodiment, surfaces 239 are formed on thickened forward portions of the fingers. Fill and vent fittings 240, 241 are provided for supplying grease to chambers 236 and 232.

A cap 242 is mounted inside cylinder 202 forwardly of fingers 233 and surrounds a double back-to-back seal 243. This seal separates grease chamber 236 from the empty chamber 244 on the right hand side of piston 209. An annular spacer 245 is disposed between a shoulder on contactor 225 and cap 242 to hold the cap in position. Spacer 245 has apertures 246 to connect chamber 236 with fittings 240, 241. The inner end 247 of cylinder 202 is threadably mounted on the outer portion 248 of contactor 225. A single conductor cable 249 is secured by a mounting screw 251 to an adaptor 252 which in turn is secured by a mounting screw 253 to base 204.

The means for conducting cooling water to the piston rod and electrode tip comprises extensions 254 and 255 on base 204 (FIG. 9) which carry internal passages 256 and 257 respectively. Entrance passage 256 leads to a water tube 258 within piston rod 207. This water tube is secured at its rearward end 259 to base 204 and is supported at its forward end by a tubular telescoping adaptor 261 secured at 262 within the forward end of piston rod 207. The water flow path will be from an entrance port 263 at the upper end of base 204 through passage 256, tube 258, adaptor 261 and a water deflector tube 264 to welding tip 223. From the welding tip the water will flow back around the outside of the deflector tube through axial passages 265 around the periphery of adaptor portion 262 to a passage 266 between tube 258 and piston rod 207. Cooling water will occupy chamber 231 which is connected to passage 266 through the rearward end of piston rod 207, thus serving to cool the piston rod and connector 225. Cooling water will flow outwardly through base passage 257 to exit port 267.

In operation of the embodiment of FIGS. 7 through 12, current will flow from conductor 249 through adaptor 252 and base 204 to contactor 225. The current flow will be through portion 226 of contactor 225 which is threaded onto base extension 227, and from there through fingers 233 to piston rod 207. The current will flow through the piston rod to electrode tip 223 through adaptor 224. Current flow from contactor 225 to the piston rod will be through contactor surfaces 239 held against the piston rod by garter spring 237 which insures bearing pressure at the sliding joint. As in the previous embodiment, chambers 232 and 236 may be filled with electrically neutral silver bearing grease to provide arc quenching characteristics to the sliding joint and cause a self plating effect on the sliding piston rod and contactor surfaces due to the passage of electrical current through this joint. As explained previously, the electrical contactor arrangement is such as not to interfere with the cooling water passages through the piston rod and electrode tip.

While it will be apparent that the preferred embodiments of the invention disclosed are well calculated to fulfill the objects stated above, it will be appreciated that the invention is susceptible to modification, variation and change without departing from the proper scope or fair meaning of the subjoined claims.

I claim:

1. In combination, a cylinder, a piston rod slidable in said cylinder, a stationary contactor having a first portion and a plurality of circumferentially arranged flexible fingers extending axially from said first portion, said fingers having inwardly facing surfaces, means urging said surfaces into contact with the external surface of said piston rod, portions of said fingers spaced outwardly from said piston rod thus forming a first grease chamber, a cooling chamber disposed adjacent to said first grease chamber through which a cooling fluid passes for cooling said piston rod and said inwardly facing surfaces of said fingers in contact therewith, sealing means interposed between said first grease chamber and said cooling chamber and slidably engageable with said piston rod to separate said first grease chamber and said cooling chamber, and a direct, positive and immovable connection between an electrical cable conductor and said first portion of the stationary contactor whereby current does not pass through said cylinder.

2. The combination according to claim 1, said urging means comprising a garter spring surrounding said fingers.

3. The combination according to claim 1, slits being formed between said fingers, apertured portions in said fingers at the inner ends of said slits and means forming a second grease chamber outwardly of said fingers, said apertured portions connecting said first and second grease chambers.

4. The combination according to claim 2, further provided with a recess in the outer surfaces of said fingers for retaining said garter spring.

5. The combination according to claims 1, 2 or 4, said cylinder forming part of a portable welding gun, said piston rod extending outwardly from both ends of said cylinder, the forward end of said piston rod carrying a first welding electrode tip, and a housing secured to the rearward end of said cylinder and enclosing the rearward end of said piston rod, said stationary contactor being enclosed with said housing.

6. The combination according to claim 5, said first portion of the stationary contactor being secured between said housing and one end of said cylinder.

7. The combination according to claim 6, further provided with a second grease chamber formed between said housing and contactor fingers, and said sealing means comprising a double back-to-back expansion seal carried by said housing and slidably engageable with said piston rod so as to separate said first grease and cooling chambers.

8. The combination according to claims 1, 2 or 4, said electrical cable connecting means comprising a radial extension on said first portion of the contactor, and means securing an electrical cable conductor thereto.

9. The combination according to claim 8, said cylinder forming part of a portable welding gun, said gun being further provided with a lower gun adaptor arm, and means connecting another cable conductor to said last-mentioned arm.

10. The combination according to claims 1, 2 or 4, said cylinder forming part of a welding gun, and cooling water passages formed in said welding gun for said piston rod and electrode tip, said passages including a passage inside said piston rod.

11. The combination according to claim 10, further provided with a tube within the piston rod separating entrance and exit water passages, the piston rod cooling water passages extending past said inwardly facing contactor surfaces.

12. The combination according to claims 1, 2 or 4, said cylinder being part of a fixture type welding gun, and a base, said stationary contactor and cylinder being secured to said base with said contactor being in the electrically conductive relation with the base, said electrical conductor connecting means comprising means of connecting said conductor to said base.

13. The combination according to claim 1, said sealing means comprising double back-to-back expansion seals carried by an intermediate portion of said stationary contactor.

14. The combination according to claims 1, 2 or 4, said cylinder forming part of a welding gun, further provided with a closed chamber formed around said fingers and filled with a substance shielding the fingers.

* * * * *

UNITED STATES PATENT AND TRADEMARK OFFICE
CERTIFICATE OF CORRECTION

PATENT NO. : 4,260,868
DATED : April 7, 1981
INVENTOR(S) : Harry E. Day

It is certified that error appears in the above—identified patent and that said Letters Patent is hereby corrected as shown below:

Column 2, line 10 - after "with" insert --the--.

Column 4, line 4 - delete "the" (second occurrence).

Column 4, line 14 - "41" should be --94--.

Column 4, line 15 - "94" should be --41--.

Signed and Sealed this

Twenty-ninth Day of September 1981

[SEAL]

Attest:

Attesting Officer

GERALD J. MOSSINGHOFF

Commissioner of Patents and Trademarks